B. SPANKE.
PORTABLE GRAZING PEN AND CHICKEN COOP.
APPLICATION FILED JULY 20, 1912.
1,109,477.
Patented Sept. 1, 1914.
2 SHEETS—SHEET 1.
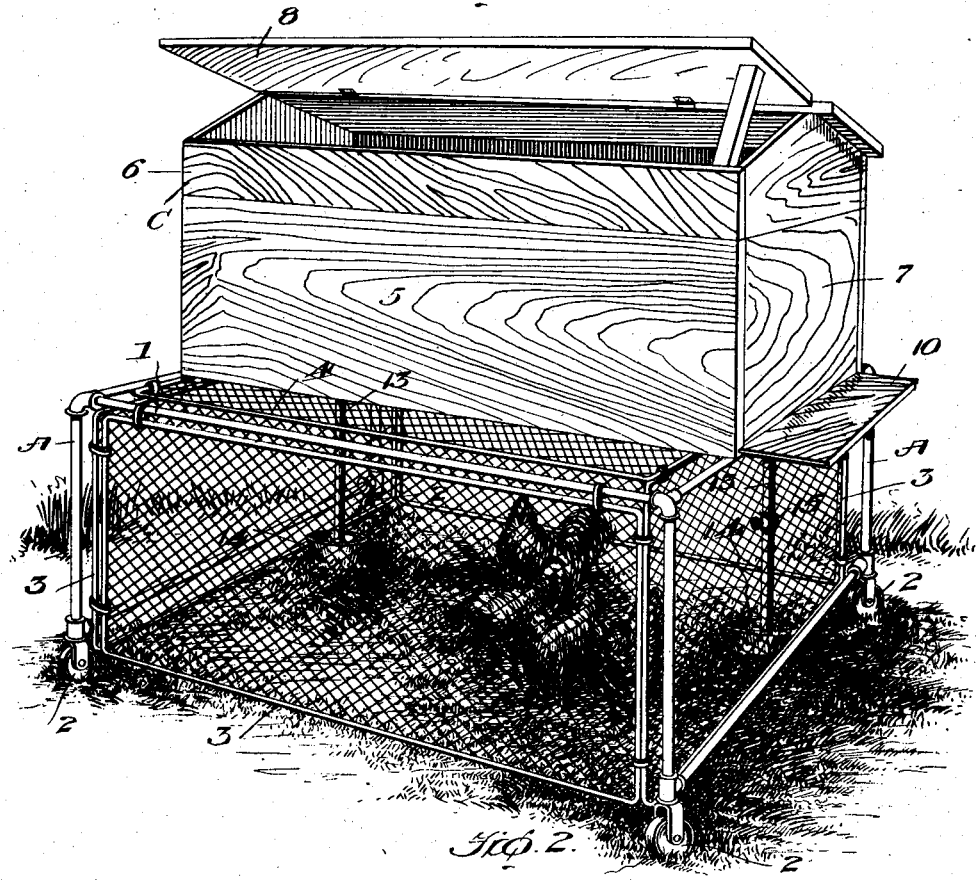
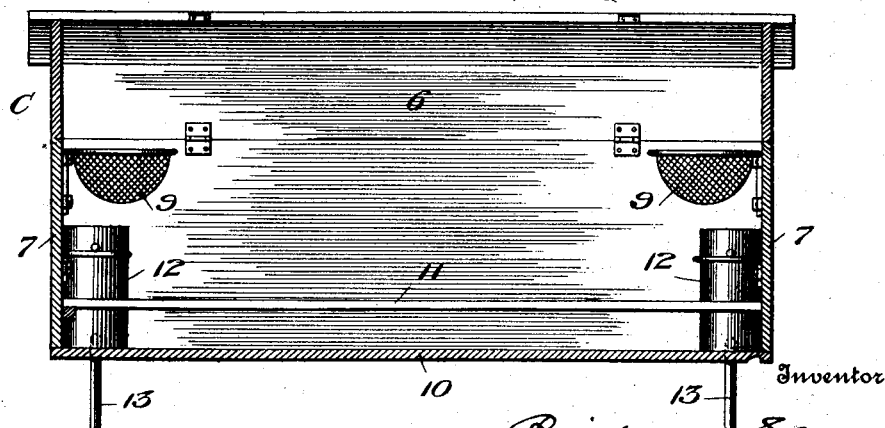

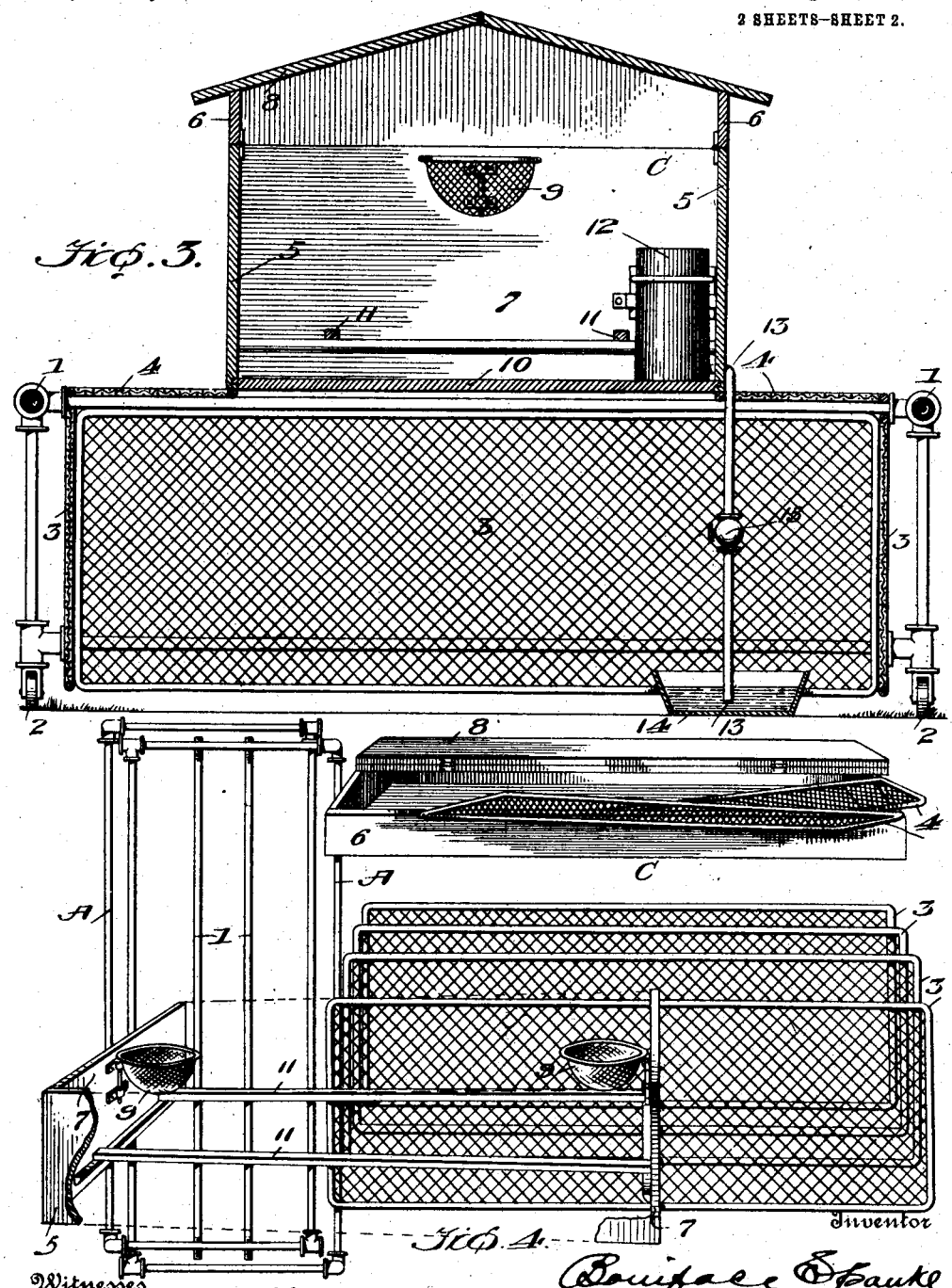

UNITED STATES PATENT OFFICE.

BONIFACE SPANKE, OF NEVADA, MISSOURI.

PORTABLE GRAZING-PEN AND CHICKEN-COOP.

1,109,477.     Specification of Letters Patent.     Patented Sept. 1, 1914.

Application filed July 20, 1912. Serial No. 710,564.

*To all whom it may concern:*

Be it known that I, BONIFACE SPANKE, a citizen of the United States, residing at Nevada, in the county of Vernon and State of Missouri, have invented certain new and useful Improvements in Portable Grazing-Pens and Chicken-Coops, of which the following is a specification.

My invention relates to a combined portable knock-down grazing-pen and chicken-coop, the primary object being to provide a pen which may be easily moved from place to place with ease and convenience and with the least possible disturbance to the chickens in the pen.

With the foregoing in view, this invention comprises two inverted U-shaped members resting at their lower ends on rollers, said members adapted to be placed vertically and connected together by cross-members in connection with a set of reticulated panels depending from this frame-work in planes inside the rollers, so that in moving the pen from place to place the chickens are protected from the rollers.

My invention further consists of a frame, reticulated top and side panels arranged within the outer planes of the frame, a coop mounted over and carried by the pen, and a removable bottom between the pen and the coop.

In the accompanying drawings: Figure 1 is a view in perspective, Fig. 2 is a longitudinal section through the coop, Fig. 3 is a transverse section through the coop and pen, and Fig. 4 is a view showing the parts in their knock-down condition.

The grazing-pen may be made of any desired material, in size and dimensions to suit the requirements, and it comprises a frame A made of two inverted U-shaped side members arranged vertically and supported at their lower ends on rollers or casters 2, 2, and cross-braces 1, 1, connect these members both at top and bottom, thus forming a rigid frame. Reticulated panels 3, 3, depend from the upper horizontal portions of the frame in planes within the rollers or casters, as shown in Figs. 1 and 2, to a point only slightly above the surface of the ground, so that the chickens are protected and not run over by the rollers in moving the pen from place to place while at the same time the bottom is open so they stand upon the ground and can travel with the pen as it is moved. The main portion of the top is open, and above it is mounted the coop C, the spaces at the sides being covered by the reticulated tops 4, 4.

The coop can be made in any approved form, but preferably is of the knock-down type and comprises sides 5, 5, hinged to the sections C, C, and the removable ends 7, 7, and has one slope 8 of the roof hinged or removable at the ridge whereby to gain access to the interior of the coop. Nests 9, 9, are provided within the coop. There is a sliding or removable bottom 10 which divides the coop from the pen when slid in, or throws the two into communication with each other when pulled out. When closed, this bottom 10 will protect the fowls during the night, and in cold weather will afford ventilation and at the same time keep the coop warm. Perches 11, 11, are placed within the coop, and cans 12 are adapted to contain water, pipes 13, 13, extending down a suitable distance to the cups or pans 14, 14 to supply water to the latter. A valve 15 in each pipe controls the flow of water. It is convenient to take both the coop and pen apart and store it in comparatively small space, as is illustrated in Fig. 4 of the drawings; and at the same time it is easy to assemble.

It is evident that more or less slight changes might be resorted to in the form and arrangement of the several parts described without departure from the spirit and scope of my invention, and hence I do not wish to be limited to the exact construction herein set forth, but:—

I claim:

1. A knock-down portable grazing pen comprising a frame made up of inverted U-shaped members and cross-bars, said frame mounted and supported at its lower ends on rollers, an open bottom, covered top, and reticulated side panels depending from the frame and located a sufficient distance in from the rollers to afford protection for the poultry in moving the pen from place to place, said rollers forming the sole support of the pen and holding the lower edges of the panels at a substantially uniform distance at all times from the ground or surface on which the pen rests.

2. A knock-down portable grazing pen and coop comprising a frame made up of inverted U-shaped sides, and cross-rods, said frame mounted and carried at its lower ends on rollers, a coop carried on said frame and having a movable bottom between the coop and pen forming a door-way between the two, and reticulated side-panels carried by the frame in planes within the areas of the rollers.

In testimony whereof I affix my signature, in presence of two witnesses.

BONIFACE SPANKE.

Witnesses:
O. H. Hoss,
S. C. Carter.

Copies of this patent may be obtained for five cents each, by addressing the "Commissioner of Patents, Washington, D. C."